No. 614,781. Patented Nov. 22, 1898.
G. J. ALTHAM.
VEHICLE.
(Application filed Dec. 31, 1897.)
(No Model.) 2 Sheets—Sheet 2.
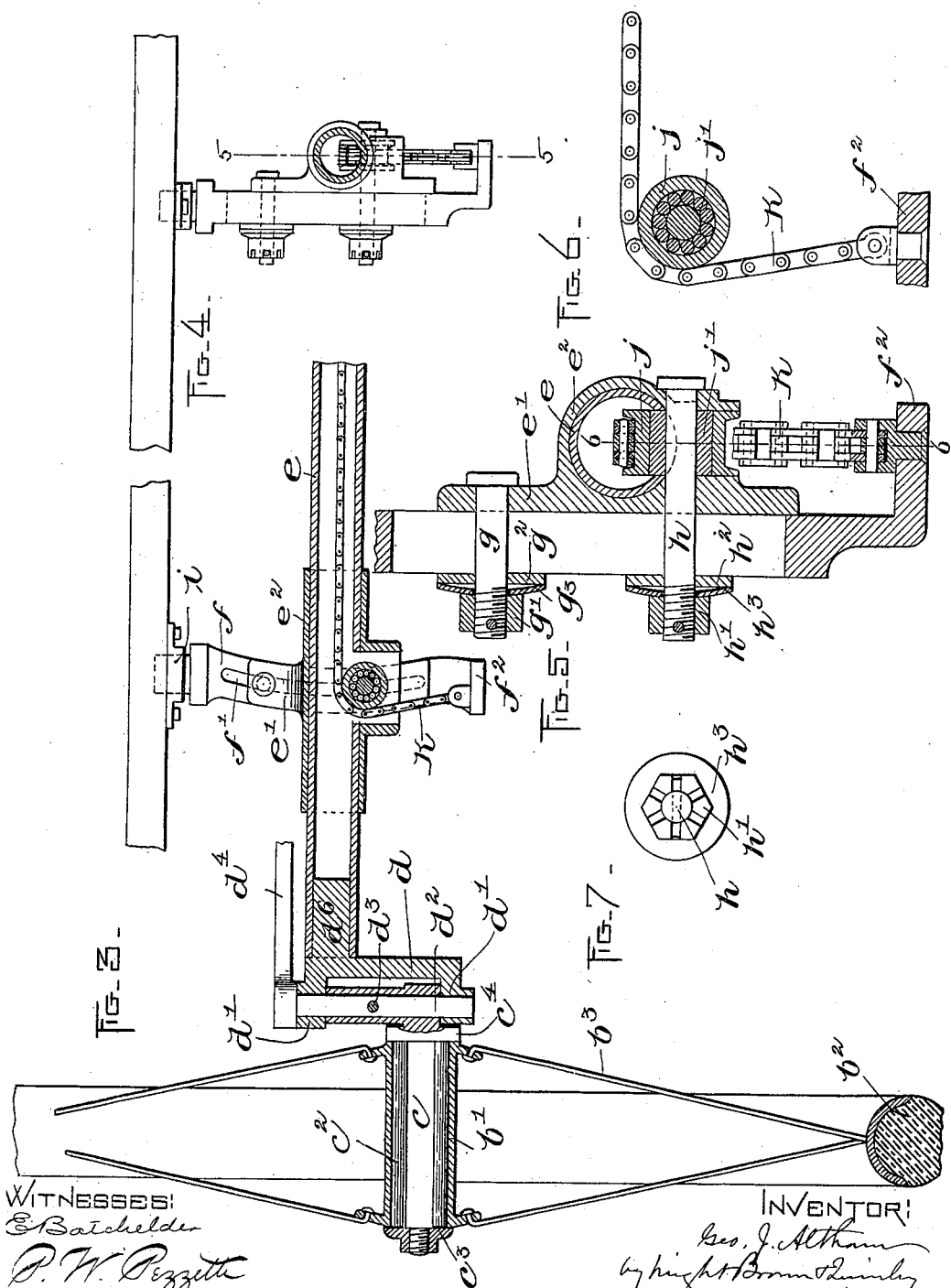

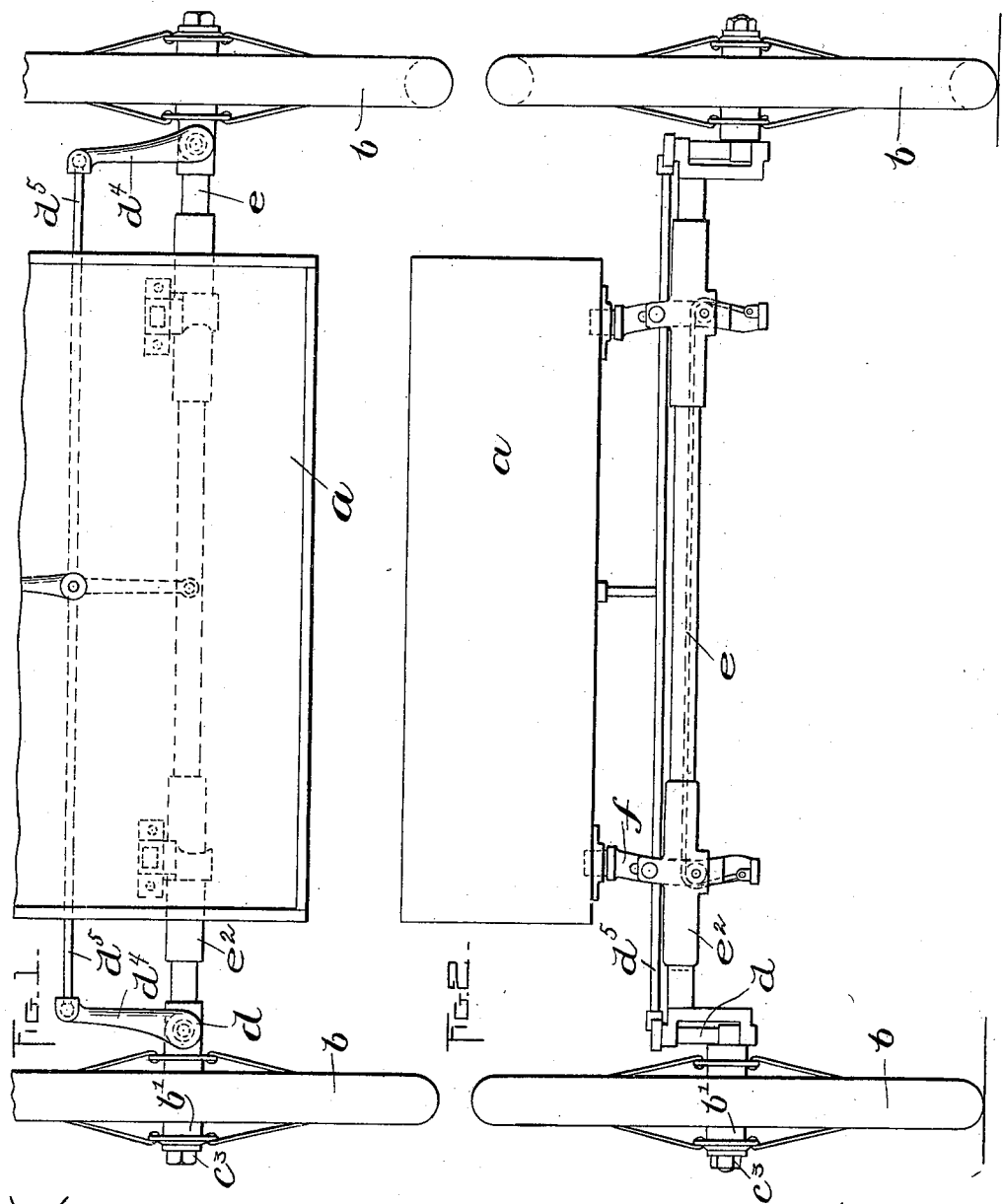

UNITED STATES PATENT OFFICE.

GEORGE J. ALTHAM, OF SWANSEA, MASSACHUSETTS.

VEHICLE.

SPECIFICATION forming part of Letters Patent No. 614,781, dated November 22, 1898.

Application filed December 31, 1897. Serial No. 665,071. (No model.)

*To all whom it may concern:*

Be it known that I, GEORGE J. ALTHAM, of Swansea, in the county of Bristol and State of Massachusetts, have invented certain new and useful Improvements in Vehicles, of which the following is a specification.

This invention has relation to vehicles generally, and though designed more especially for embodiment in that class of vehicles in which the driving power is imparted to the wheels from a motor in the vehicle, yet it may be employed on wagons and carriages of other constructions and propelled in other ways.

The object of the invention is to provide certain improvements in the running-gear whereby the body of the vehicle may be supported flexibly and the axle may have a yielding movement in a plane transverse to the said body.

To these ends the invention consists in a vehicle having certain features of improvement which are illustrated upon the drawings and are now to be described in detail and then pointed out in the claims hereunto appended.

Reference is to be had to the accompanying drawings, and to the letters marked thereon, forming a part of this specification, the same letters designating the same parts or features, as the case may be, wherever they occur.

Of the drawings, Figure 1 represents in plan view the front portion of a motor-carriage. Fig. 2 represents the same in front elevation. Fig. 3 represents a longitudinal section through the axle, only one-half thereof being shown. Fig. 4 represents a transverse section through the axle, the guide and the parts adjacent thereto being shown in elevation. Fig. 5 represents an enlarged section on the line 5 5 of Fig. 4. Fig. 6 represents a partial section on the line 6 6 of Fig. 5. Fig. 7 represents one of the nuts detached.

Referring to the drawings, $a$ indicates a superstructure of the vehicle which is either the body or else a support on which the body may be yieldingly mounted, and $b$ $b$ indicates the front wheels, said wheels being illustrated as each having a barrel hub $b'$, a rubber tire $b^2$, and metallic spokes $b^3$ $b^3$. Each hub is placed on a spindle $c$, extending outward from a tube or sleeve $c'$, and between them are anti-friction devices $c^2$ of any approved kind. The outer end of the spindle is reduced and threaded to receive the nut $c^3$, by means of which the wheel is held in place, it being maintained against inward movement by a flange $c^4$ on the spindle.

The sleeve is arranged vertically and is supported in two lugs $d'$ $d'$, projecting out from the hanger $d$, there being a pivot stud or pin $d^2$ passed through apertures in the said lugs and through the said sleeve and secured to the sleeve by a key or pin $d^3$. On the upper end of each of the pivot-studs or secured thereto is an arm $d^4$, the two arms projecting rearwardly and being attached by links $d^5$ with the steering-gear, (not shown,) by means of which the attendant in the carriage guides its movements. By swinging the wheels in the same direction around the axes of the vertically-arranged pivot-studs $d^2$ the carriage may be guided in a straight line or swerved toward one side or the other.

The hangers $d$ are each provided with a stud $d^6$, extending into and secured to a tubular axle $e$, supported in sliding brackets $e'$ $e'$. Each bracket has an oppositely-extending sleeve-like portion $e^2$ to receive the axle and a transversely-arranged portion to slide against a guide $f$, depending from the body of the vehicle. Each of the guides $f$ is formed with a curved slot $f'$, which is the arc of a circle struck from a point midway between the two and is provided at its end with a forwardly-projecting lug $f^2$.

Bolts $g$ $h$ are passed through apertures in the brackets and through the curved slot $f'$, and on their threaded ends are placed nuts $g'$ $h'$, flat washers $g^2$ $h^2$, and curved spring-washers $g^3$ $h^3$. The outer faces of the nuts $g'$ $h'$ are radially grooved to receive pins $g^4$ $h^4$, passed through apertures in the ends of the bolts when the nuts have been screwed into place, whereby the latter are locked. The curved spring-washers $g^3$ $h^3$ operate to hold the slides yieldingly against the guides or brackets.

Each of the guides $ff$ is secured to the body of the vehicle or else to a portion of the running-gear on which the body is yieldingly supported in any suitable way, as by a casting $i$, having a socket to receive the upper end thereof, and is secured to the axle by a flexible connection. Journaled upon each of the bolts $h$ is a roller $j$, which lies in an aperture in the slide and projects into the interior of the tubular axle through a slot therein. Between each roller and the bolt on which it is journaled are antifriction devices $j'$, as illustrated in Figs. 5 and 6, and passing over the rollers and through the tubular axle is a compensating flexible connection $k$, consisting of a chain having its ends secured to the lugs $f^2$ of the guides or brackets $f$. By this arrangement the vehicle is supported by the flexible chain, which in turn is hung upon the rollers in the tubular axle, and hence the superstructure of the vehicle and the wheels and axle are flexibly and yieldingly connected and are free to have a limited movement relatively to each other in lines perpendicular to the planes of the floor of the vehicle-body or of the line of travel of the vehicle. They both swing about a point located centrally between the ends of the axle, whereby the body of the wagon is not jolted when the wheels pass over ruts or stones in the road, and at the same time the body of the vehicle is supported at points near its outer edges, whereby it cannot be easily overturned, and, moreover, the wheels by this arrangement all have a uniform bearing on the ground and run smoothly at all times without tilting the vehicle when any one of them passes over an obstruction.

I have described my improvement as employed in connection with the front wheels; but it will be understood that it may be used in connection with the rear wheels also, and again, while I have described the brackets or guides as being supported by the superstructure of the vehicle and employ that word in the claims I desire to be construed as meaning that the brackets may be attached either to the body proper or else to any portion of the vehicle between it and the axle, as a frame or truck on which the said body may be yieldingly or otherwise supported.

Having thus explained the nature of the invention and described a way of constructing and using the same, though without attempting to set forth all of the forms in which it may be made or all of the modes of its use, I declare that what I claim is—

1. A vehicle having a superstructure, an axle, wheels on the ends of the axle, and a loose compensating flexible connection between the axle and the superstructure on which the superstructure is supported, whereby the axle and the superstructure are free to have an oscillatory movement about a center relatively to each other in planes perpendicular to the longitudinal axis of the vehicle.

2. A vehicle having a superstructure, a front axle stationary longitudinally of the superstructure, and a loose compensating flexible connection between the superstructure and the axle and on which the said superstructure is supported whereby they are free to oscillate relatively to each other in planes transverse to the longitudinal axis of the superstructure.

3. A vehicle having a superstructure, an axle, wheels on the end of said axle, and a flexible non-extensible connection for the same consisting of a cord or chain on which the superstructure is supported, said cord or chain being connected at its ends to the superstructure and having its intermediate portions supported loosely upon the axle.

4. A vehicle having a superstructure, an axle, and a flexible connection for the same consisting of brackets depending from the said superstructure to points below the axle, and a cord or chain on which the said superstructure is supported, said cord or chain having its ends connected to the ends of the brackets and having its intermediate portions supported by the axle, whereby the axle is capable of oscillating relatively to the superstructure.

5. A vehicle comprising a superstructure having depending guides, an axle, slides movable on said guides and having provisions for receiving and supporting the axle, rollers journaled on said slides, and a flexible cord or chain having its ends connected to said guides and having its intermediate portions passing over said rollers.

6. A vehicle comprising a superstructure having depending curved guides, a tubular axle, slides movable along said guides and having provisions for receiving said axle, and a chain or cord having its ends secured to the depending guides and having its central portion passing loosely through the tubular axle.

7. A vehicle comprising a superstructure, an axle, compensating flexible connections between the axle and the superstructure, whereby the axle is free to oscillate in planes transverse to the longitudinal axis of the body, wheels connected by vertical pivots with the ends of the axles, and means for swinging said wheels about the said vertical pivots.

In testimony whereof I have signed my name to this specification, in the presence of two subscribing witnesses, this 11th day of December, A. D. 1897.

GEORGE J. ALTHAM.

Witnesses:
C. F. BROWN,
E. BATCHELDER.